United States Patent
Arif Khan et al.

(10) Patent No.: US 11,451,532 B2
(45) Date of Patent: Sep. 20, 2022

(54) BEHAVIORAL BIOMETRICS AND MACHINE LEARNING TO SECURE WEBSITE LOGINS

(71) Applicant: Dell Products L. P., Round Rock, TX (US)

(72) Inventors: Falaah Arif Khan, Hyderabad (IN); Sajin Kunhambu, Bangalore (IN); Kalyan Chakravarthy Gangavaram, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 751 days.

(21) Appl. No.: 16/257,650

(22) Filed: Jan. 25, 2019

(65) Prior Publication Data

US 2020/0244639 A1    Jul. 30, 2020

(51) Int. Cl.
*H04L 29/06*   (2006.01)
*H04L 9/40*    (2022.01)
(Continued)

(52) U.S. Cl.
CPC .......... *H04L 63/083* (2013.01); *G06F 21/316* (2013.01); *G06N 20/00* (2019.01);
(Continued)

(58) Field of Classification Search
CPC . H04L 63/083; H04L 63/0861; H04L 63/101; H04L 67/02; G06N 20/10;
(Continued)

(56) References Cited

U.S. PATENT DOCUMENTS

| 8,489,635 | B1 * | 7/2013 | Phoha | G06F 21/316 |
| | | | | 713/184 |
| 10,032,010 | B2 * | 7/2018 | Turgeman | H04W 12/06 |

(Continued)

OTHER PUBLICATIONS

K. O. Bailey, J. S. Okolica, and G. L. Peterson, "User identification and authentication using multi-modal behavioral biometrics," vol. 43, pp. 77-89, 2014. (Year: 2014).*

(Continued)

*Primary Examiner* — Saleh Najjar
*Assistant Examiner* — Khalid M Almaghayreh
(74) *Attorney, Agent, or Firm* — Krishnendu Gupta; Deepika Bhayana; Derek Lam

(57) ABSTRACT

A system that uses a client's behavioral biometrics—mouse dynamics, keystrokes, and mouse click patterns—to create a Machine Learning (ML) based customized security model for each client/user to secure website log-ins. The ML model can differentiate the user of interest from an impersonator—human or non-human (robot). The model collects relevant behavioral biometric data from the client when a new account is created by the client/user on a website or when the client initially logs-in to the website. The collected biometric data are used to train an ensemble of ML-based classifiers—a Multilayer Perceptron (MLP) classifier, a Support Vector Machine (SVM) classifier, and an Adaptive Boosting (AdaBoost) classifier—in the model. The trained versions of these classifiers are polled to give an optimal prediction in real-time (while the user is logging in). As a result, real-time fraud detection can be accomplished without impacting the log-in performance of the website.

17 Claims, 4 Drawing Sheets

(51) Int. Cl.
*G06N 20/10* (2019.01)
*G06N 20/20* (2019.01)
*G06F 21/31* (2013.01)
*G06N 20/00* (2019.01)

(52) U.S. Cl.
CPC ............. *G06N 20/10* (2019.01); *G06N 20/20* (2019.01); *H04L 63/0861* (2013.01)

(58) Field of Classification Search
CPC .......... G06N 20/20; G06N 7/005; G06N 3/08; G06F 21/32; G06F 21/316
See application file for complete search history.

(56) References Cited

U.S. PATENT DOCUMENTS

| | | | |
|---|---|---|---|
| 10,069,852 B2* | 9/2018 | Turgeman | G06F 21/121 |
| 10,075,437 B1* | 9/2018 | Costigan | H04L 67/306 |
| 10,164,985 B2* | 12/2018 | Turgeman | H04L 63/1408 |
| 10,289,819 B2* | 5/2019 | Stavrou | G06F 21/316 |
| 10,423,766 B2* | 9/2019 | Huang | H04W 12/126 |
| 10,693,661 B1* | 6/2020 | Hamlet | G06F 21/31 |
| 10,864,444 B1* | 12/2020 | Rao | A63F 13/35 |
| 11,095,642 B2* | 8/2021 | Mitzimberg | G06F 21/552 |
| 2004/0010606 A1* | 1/2004 | Delaney | G06F 21/31 709/204 |
| 2008/0113791 A1* | 5/2008 | Williams | G06F 21/31 463/29 |
| 2011/0016240 A1* | 1/2011 | Mills | G09B 7/02 715/733 |
| 2013/0263240 A1* | 10/2013 | Moskovitch | G06F 21/32 726/7 |
| 2015/0358317 A1* | 12/2015 | Deutschmann | H04W 12/065 713/186 |
| 2015/0363785 A1* | 12/2015 | Perez | G06Q 20/40145 705/44 |
| 2015/0379429 A1* | 12/2015 | Lee | G09B 5/00 706/11 |
| 2016/0057623 A1* | 2/2016 | Dutt | H04W 12/126 455/411 |
| 2016/0087957 A1* | 3/2016 | Shah | H04L 63/205 726/1 |
| 2016/0269411 A1* | 9/2016 | Malachi | H04L 63/0421 |
| 2017/0024055 A1* | 1/2017 | Schwarz | G06F 3/041 |
| 2017/0031588 A1* | 2/2017 | Berger | G06F 3/03547 |
| 2017/0230363 A1* | 8/2017 | Deutschmann | H04W 12/065 |
| 2018/0012003 A1* | 1/2018 | Asulin | G06F 21/36 |
| 2018/0082304 A1* | 3/2018 | Summerlin | G06Q 20/3229 |
| 2020/0045044 A1* | 2/2020 | Turgeman | G06F 3/04883 |
| 2020/0303071 A1* | 9/2020 | Miller | G16H 50/70 |

OTHER PUBLICATIONS

Bailey, K. O., Okolica, J. S., & Peterson, G. L. (2014). User identification and authentication using multi-modal behavioral biometrics. Computers & Security, 43, 77-89. (Year: 2014).*

I. Traore, I. Woungang, M. S. Obaidat, Y. Nakkabi and I. Lai, "Combining Mouse and Keystroke Dynamics Biometrics for Risk-Based Authentication in Web Environments," 2012 Fourth International Conference on Digital Home, 2012, pp. 138-145, doi: 10.1109/ICDH.2012.59. (Year: 2012).*

Baileyetai., User identification and authentication using multimodal behavioral biometrics, Computers & Security, vol. 43, 2014 pp. 77-89 (Year: 2014).*

Ho, Jiacang, Et al., "Mini-Batch Ensemble Method on Keystroke Dynamics based User Authentication," International Journal of Advanced Smart Convergence, vol. 5 No 3. pp. 40-46, Jul. 2016.

Moskovitch, Robert, et al., "Identity Theft, Computers and Behavioral Biometrics," Jan. 2009, 7 pages.

* cited by examiner

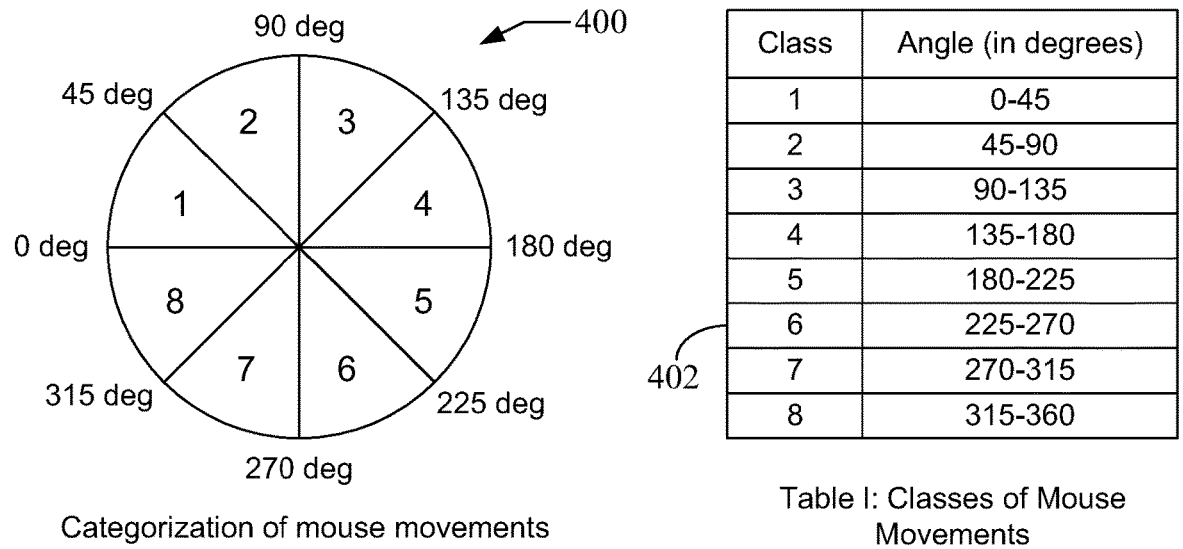

Categorization of mouse movements

Table I: Classes of Mouse Movements

| Class | Angle (in degrees) |
|---|---|
| 1 | 0-45 |
| 2 | 45-90 |
| 3 | 90-135 |
| 4 | 135-180 |
| 5 | 180-225 |
| 6 | 225-270 |
| 7 | 270-315 |
| 8 | 315-360 |

| Category | Description |
|---|---|
| 1 | Upper case: A-Z and special characters that require a preceding shift (control key) |
| 2 | Lower case: a-z, numbers |
| 3 | Control: tab, backspace, delete, arrow keys |
| 4 | Others |

Table II: Key Categories

FIG. 6

| Train:Test split | Accuracy | | |
|---|---|---|---|
| | MLP | SVM | AdaBoost |
| 80:20 | 0.883 | 0.969 | 0.961 |
| 70:30 | 0.879 | 0.954 | 0.946 |
| 60:40 | 0.873 | 0.949 | 0.936 |
| 50:50 | 0.854 | 0.949 | 0.937 |

Table III: Comparison of Accuracies for Different Train:Test Splits, with N=4

| Train:Test split | Accuracy | | |
|---|---|---|---|
| | MLP | SVM | AdaBoost |
| 80:20 | 0.895 | 0.973 | 0.947 |
| 70:30 | 0.900 | 0.971 | 0.947 |
| 60:40 | 0.902 | 0.969 | 0.942 |
| 50:50 | 0.892 | 0.983 | 0.952 |

— 700

Table IV: Comparison of Accuracies for Different Train:Test Splits, with N=5

| Performance Metric | Classifer | | |
|---|---|---|---|
| | MLP | SVM | AdaBoost |
| Accuracy | 0.952 | 1 | 0.952 |
| Precision | 1 | 1 | 0.928 |
| Recall | 0.933 | 1 | 1 |

800

Table V: Summary of Saved Model

BEHAVIORAL BIOMETRICS AND MACHINE LEARNING TO SECURE WEBSITE LOGINS

TECHNICAL FIELD

This disclosure relates generally to protection against identity fraud in online transactions and, more particularly, to a website security model in which a user's behavioral biometrics—such as mouse dynamics, keystrokes, and click patterns—during a website login are collected to create and implement a customized security model based on multiple Machine Learning (ML) classifiers to differentiate the user from an impersonator to provide enhanced security for the user's website logins even if the user's log-in credentials are compromised.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smart phones), corporate (or small business) server and data processing systems, and the like. These devices may vary in size, shape, performance, functionality, and price. In any event, almost all of these modern devices are equipped with relevant hardware and software to allow their users to access a number of different websites over the Internet and perform online transactions.

In a world dominated by e-commerce and electronic transactions, the business value of a secure website is immeasurable. With the wide-spread availability of Artificial Intelligence (AI) and data collection through net bots, hackers have far more sophisticated tools at their disposal to perform fraudulent logins on websites, thereby orchestrating identity fraud on login portals. This makes user information susceptible to misuse and, once a user's log-in credentials have been compromised, intruders can perform multiple subsequent malicious logins that go virtually undetected during log-in authentication. In an era where online transactions drive sales and generate enormous revenue for online businesses, such unauthorized and malicious attacks cost millions of dollars to the businesses.

SUMMARY

This Summary provides a simplified form of concepts that are further described below in the Detailed Description. This Summary is not intended to identify key or essential features and should therefore not be used for determining or limiting the scope of the claimed subject matter.

The present disclosure relates to the use of a client's behavioral biometrics to secure website log-ins. A client's behavioral biometrics during a website login may include, for example, the client's mouse dynamics, keystrokes, and mouse click patterns. In one embodiment, these biometrics are used to create an ML-based customized security model for each client/user that can differentiate the user of interest from an impersonator—human or non-human (robot). Such a model, combined with existing security protocols, may provide enhanced security for the user's profile during log-ins, even if the user's log-in credentials are compromised or hacked. The model may initially collect relevant behavioral biometric data from the client side when a new account is created by the client/user on a website or when the client initially logs-in to the website. The program code or software module for data collection can be easily integrated with any web application without impacting website performance. The collected biometric data may be used to train an ensemble of ML-based classifiers in the security model. In one embodiment, the ensemble may include the following three classifiers: a Multilayer Perceptron (MLP) based classifier, a Support Vector Machine (SVM) based classifier, and an Adaptive Boosting (AdaBoost) based classifier. After sufficient collection of login data, the model may deploy biometric-based fraud detection means to secure the user's account against future impersonators. In one embodiment, the fraud detection means may include the trained versions of the earlier-mentioned MLP, SVM, and AdaBoost classifiers, which are polled to give an optimal prediction in real-time (while the user is logging in).

In one embodiment, the present disclosure is directed to a method, which comprises: (i) receiving, by a computing system, a user-specific dataset for a first user when the first user performs a log-in to a website, wherein the dataset includes the following: (a) coordinates of a pointing device at each time the pointing device is moved by the first user during the log-in, (b) timestamps associated with pressing and release of each key on a data input device by the first user during the log-in, (c) timestamps of all clicks of the pointing device by the first user from beginning to end of the log-in, and (d) a key-specific code of each key being pressed by the first user on the data input device during the log-in; (ii) training, by the computing system, a plurality of machine learning-based classifiers in a machine learning (ML) model based on the received user-specific dataset; and (iii) using, by the computing system, the trained ML model to reject a log-in attempt to the website by a second user with log-in credentials of the first user, wherein the second user is different from the first user. The second user may be a human user or a non-human user. In particular embodiments, the plurality of ML-based classifiers is an ensemble of the above-mentioned MLP, SVM, and AdaBoost classifiers.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) receive a user-specific dataset for a first user when the first user performs a log-in to a website, wherein the dataset includes the following: (a) coordinates of a pointing device at each time the pointing device is moved by the first user during the log-in, (b) timestamps associated with pressing and release of each key on a data input device by the first user during the log-in, (c) timestamps of all clicks of the pointing device by the first user from beginning to end of the log-in, and (d) a key-specific code of each key being pressed by the first user on the data input device during the log-in; (ii) train a plurality of machine learning-based classifiers in an ML model based on the received user-specific dataset; and (iii) poll the trained classifiers to reject a log-in attempt to the website by a second user with log-in credentials of the first user, wherein the second user is different from the first user.

In a further embodiment, the present disclosure is directed to a computer program product comprising a non-transitory computer-usable medium having computer-readable program code embodied therein, wherein the computer-readable program code is adapted to be executed by a computing system to implement a method. The method comprises: (i) receiving a user-specific dataset for a first user when the first user performs a log-in to a website, wherein the dataset includes the following: (a) coordinates of a pointing device at each time the pointing device is moved by the first user during the log-in, (b) timestamps associated with pressing and release of each key on a data input device by the first user during the log-in, (c) timestamps of all clicks of the pointing device by the first user from beginning to end of the log-in, and (d) a key-specific American Standard Code for Information Interchange (ASCII) code of each key being pressed by the first user on the data input device during the log-in; (ii) training a plurality of machine learning-based classifiers in an ML model based on the received user-specific dataset; and (iii) using the trained ML model to reject a log-in attempt to the website by a second user with log-in credentials of the first user, wherein the second user is different from the first user.

With increasing availability of AI-based hacking tools and stolen data—through net bots or otherwise—to the hackers, websites face challenges in terms of brute-force and account-match attacks on their user base. Dictionary and other brute force attacks easily bypass static security rules and put user information in malicious hands. It is becoming harder for website support personnel to catch up with hackers and manually intervene when a user's log-in credentials are compromised. Therefore, the security model as per particular embodiments of the present disclosure utilizes the most relevant, but generally overlooked and underused information from the client side—that is, the behavioral biometrics of the client when the client performs a website log-in. The training of an ensemble of ML-based classifiers with the collected behavioral biometric data and subsequent polling of the ensemble provides an optimal prediction in real-time with a reasonably small amount of data, ensuring that the security model is not computationally expensive. As a result, real-time fraud detection can be accomplished without impacting the log-in performance of the respective website.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

FIG. 4 shows an exemplary illustration of how a user's mouse movements may be categorized into various classes as per certain embodiments of the present disclosure.

FIG. 5 is an exemplary table depicting categories that may be assigned to a user's keystrokes on a data input device as per particular embodiments of the present disclosure.

FIG. 6 shows an exemplary table comparing accuracies of various ML classifiers for different train:test splits as per one embodiment of the present disclosure when a user's mouse activity was divided into 4 mini-batches (N=4) for each session.

DETAILED DESCRIPTION

Figure 1:
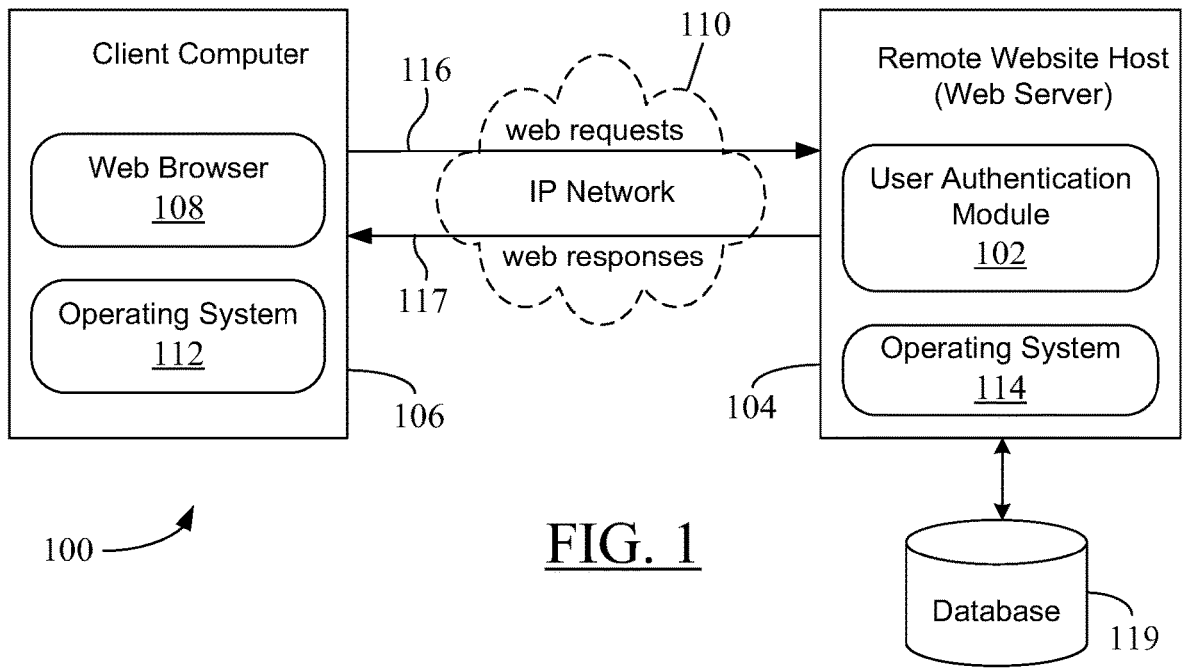
FIG. 1 shows an exemplary arrangement to implement behavioral biometrics based secure website logins with a user authentication module as per particular embodiments of the present disclosure.

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "user-specific", "log-in", "computer-readable", etc.) may be occasionally interchangeably used with its non-hyphenated version (e.g., "user specific," "login", "computer readable", etc.), and a capitalized entry (e.g., "Operating System", "Client Computer", etc.) may be interchangeably used with its non-capitalized version (e.g., "operating system," "client computer", etc.). Such occasional interchangeable uses shall not be considered inconsistent with each other.

As mentioned before, it is becoming increasingly common for malicious users to harness readily-available net bots and other sophisticated AI methods at accessible prices to perform fraudulent logins on websites, making log-in information of website's legitimate users susceptible to misuse and identity fraud. Dictionary and other brute force or account-match attacks easily bypass static security rules and put user information in malicious hands. In a world dominated by e-commerce and online transactions, such attacks cause millions of dollars in loss.

Research on security applications that use behavioral information of a client for authentication have identified two potential sources of relevant data: user's mouse movements and keystrokes, which are collectively termed as "behavioral biometrics." These applications use logs of mouse movements and keystrokes in isolation or in a rudimentary combination, and in a limited capacity. For example, some applications use such behavioral biometrics for re-authentication—like requiring re-entry of a password—and not as the first wall of security. Some other applications use a two-fold security system to replace conventional password-type logins. In these applications, a keystroke based template is the first level of authentication, and mouse movements is the second. However, such an approach is not based on passive authentication, where the biometrics work to complement existing security protocols. Rather, this two-fold security approach uses a client's keystroke template as the entity against which authentication is provided. Similarly, a template of a unique mouse movement is used as a "password" at the second level of security. Still other applications use a biometric model to add additional layers of security—for example, for Data Loss Prevention (DLP) by predicting the identity of a data creator, or for user profile identification in web applications.

Thus, as noted above, current security applications utilize a significantly limited set of user behavioral biometrics—namely, mouse movements and keystrokes. As a result, features extracted from the client's behavioral biometrics are limited as well. For example, most applications that analyze mouse movements identify 8 classes into which each mouse event can be classified into, based on the relative direction of mouse movement. On the other hand, keystroke biometrics mostly focus on dwell time (the time a key remains pressed) and flight time (the time between "key up" and the next "key down"). Furthermore, biometric data collection may extend beyond the log-in activity, for example, with the help of a software agent that resides on the user's computer. Such extended data collection may result in a large amount of data to be analyzed, which can be resource-intensive and computationally expensive.

The type of detection algorithms used by current security applications differ from application-to-application. For example, some applications create a classifier that verifies the similarity between the pattern-to-be-verified and the template of the prototypes (created from the collected logs of user biometrics) using the distance-based similarity measures between the vectors of features of the pattern and the prototype. Other applications employ separate Support Vector Machine (SVM) classifiers on mouse dynamic features and for keystrokes. Still other applications use one of the following methods for classification: Bayesian Networks, Auto Associative Neural Network, the Monte Carlo approach, Gaussian probability density function, direction similarity measure, or the parallel decision trees. It is observed that the performance of these algorithms differed based on their inherent biases and variances. As a result, the performance of an anomaly detector (to identify an impersonator's login) may not be consistent across all such applications or across multiple users within the same application.

It is therefore desirable to devise a user authentication module that utilizes behavioral biometrics data in addition to mouse movements and keystrokes, thereby allowing extraction and analysis of more biometric features for improved and robust protection for a user during website log-ins. This is in contrast to the limited dataset of user behavioral biometrics collected and analyzed by current security applications, as noted before. It is also desirable that an ML-based fraud-detection model in the authentication module should be created with a reasonably small amount of data because of its application at the time of log-ins, which typically provide relatively small amount of data. Furthermore, the fraud detection needs to be done in real time (while the user is logging in) and the ML model should not be computationally expensive—that is, the evaluation of the ML model should provide a consistent and effective protection against impersonators without impacting the log-in performance on the respective website. It is also additionally desirable that the ML model be easily scalable to allow for automation of the creation of the detection model for each new user/account on the respective website.

FIG. 1 shows an exemplary arrangement 100 to implement behavioral biometrics based secure website logins with a user authentication module 102 as per particular embodiments of the present disclosure. It is observed that, in the discussion herein, the terms "user authentication module," "authentication module", and "security module" may be used interchangeably. The user authentication module 102 may be a software application comprising program code, which, upon execution by a processor (not shown) in a web server (or a remote website host) 104, enables ML-based collection and analysis of behavioral biometrics data of a user interacting with a website hosted by the server 104. The terms "web server," "server system," "server computer," or other terms of similar import may be used interchangeably herein. The user may operate a client computer (or client machine) 106 to interact with the remote website using a web browser 108 installed on the client computer 106. It is noted here that the terms "user" and "client" may be used interchangeably herein. Similarly, the terms "client computer", "client system", and "client machine" also may be used interchangeably in the discussion below.

Figures 7, 8, 9:
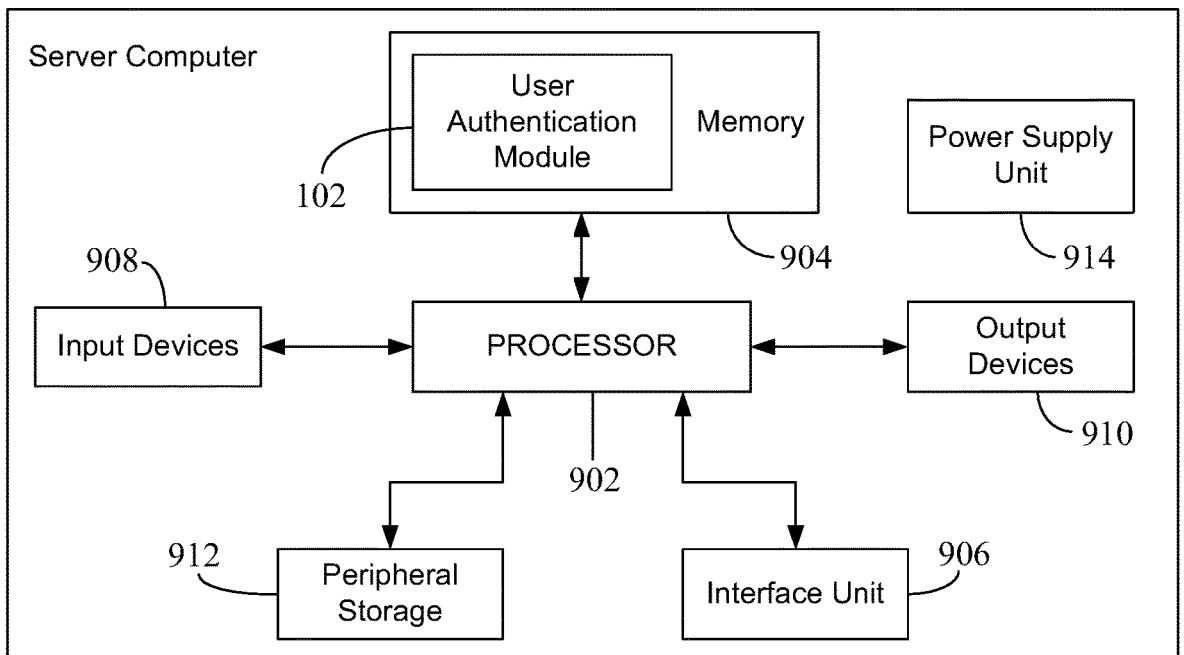
FIG. 7 shows another exemplary table comparing accuracies of various ML classifiers for different train:test splits as per one embodiment of the present disclosure when a user's mouse activity was divided into 5 mini-batches (N=5) for each session.
FIG. 8 is an exemplary table showing performance summary of various classifiers in a saved ML model as per one embodiment of the present disclosure.
FIG. 9 illustrates an example configuration of a computer system that can be used to implement the user authentication module described herein.

In some embodiments, the client computer 106 and the web server (or server computer) 104 each may be an information handling system (discussed earlier). The program code constituting the authentication module 102 may be stored in a storage unit or memory (not shown) in the web server 104. Such memory, processor, and other exemplary architectural details of the server 104 are shown in FIG. 9 and discussed later below. In some embodiments, the authentication module 102 may be associated with one or more information handling systems (not shown) managed by a web server that coordinates content delivery to/from these information systems to the client machine 106 via a common website. The architectural configuration, layout, appearance, or content of the remote website (accessed by the user) is not relevant to the present disclosure and, hence, no additional details thereof are provided here.

As illustrated in FIG. 1, the client computer 106 and the web server 104 may communicate with each other via a communication network 110 such as, for example, an Internet Protocol (IP) network. In a typical implementation, the IP network 110 may be the Internet. However, in other embodiments, the client machine 106 and the remote website host/server 104 may communicate via different types of communication networks that support bi-directional communication. In one embodiment, a user of the client computer 106 may access the website associated with the remote host 104 using the corresponding website address in the web browser 108 running on the client computer 106. As discussed later with reference to FIG. 3, when the user wishes to log-in to the website, the web server 104 may present a log-in page to the user through the browser 108 and, when the log-in page loads, it also may trigger the browser to load a browser-supplied JavaScript® (JS) as part of the log-in page. The program code for the JS may be executed by a JavaScript® engine in the browser 108, thereby enabling the browser 108 to expose certain data from the surrounding computer environment. More particularly, in the context of the present disclosure, the JavaScript®, when executed by the browser 108, may enable the browser to collect a pre-defined set of user-specific behavioral biometric data (described in more detail later with reference to FIG. 2) from the user's operation of a mouse and a keyboard (or other similar data entry devices) associated with the client computer 106.

It is noted here that the program code for the web browser 108 may be stored in a memory (not shown) in the client computer 106 and executed by a processor (not shown) in the client computer 106 under operative control of an Operating System (OS) 112 of the client machine 106. Similarly, the program code for the security module 102 may be stored in a memory (not shown) in the server computer 104 and executed by a processor (not shown) in the server computer 104 under operative control of a corresponding OS 114 of the web server 104. Although the discussion herein primarily focuses on a Microsoft® Windows® based operating systems (such as, for example, Windows® XP, Windows® 7, 8, or 10, and Windows® NT operating systems), a user authentication module as per the teachings of the present disclosure may be implemented in a server system having a different operating system.

In particular embodiments, to facilitate the user's access to the website hosted by the web server 104, the web browser 108 in the client computer 106 may communicate with the web server 104 using a request-response messaging scheme based on the Hypertext Transfer Protocol (HTTP) or the Hypertext Transfer Protocol Secure (HTTPS) if the remote website is offering an HTTPS-based communication for secure browsing experience. This request-response based HTTP/HTTPS communication is illustrated by the directional arrows 116-117 in FIG. 1 depicting web requests being sent to the server 104 and web responses being received at the client 106, respectively. As discussed later with reference to FIG. 3, the browser 108 may use a POST request under HTTP/HTTPS to send the collected behavioral biometric data to the remote host 104 for further analysis. It is noted here that the POST request message requests the web server 104 to accept the data enclosed in the body of the request message, most likely for storing it in a memory or database 119 associated with the server computer 104. In some embodiments, the database 119 may be an integral part of the server system 104. In other embodiments, the database 119 may be an external data storage unit communicatively coupled to the web server 104 for storage and retrieval of data. Additional architectural details of the server system 104 are provided later with reference to discussion of FIG. 9.

Figure 2:
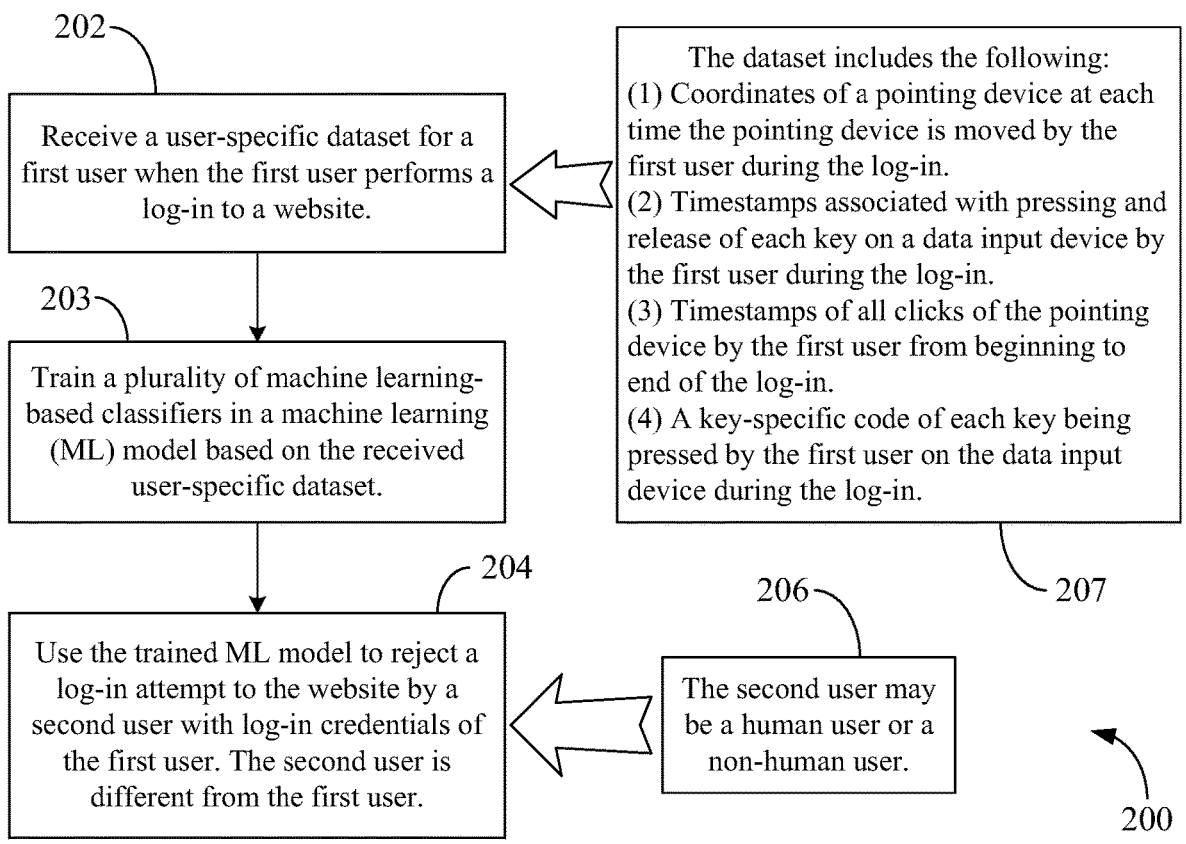
FIG. 2 is an exemplary flowchart depicting various steps that may be performed by a computing system as per particular embodiments of the present disclosure to secure website logins by a user based on the user's behavioral biometrics and machine learning (ML).

Upon execution of the program code for the authentication module 102 by a processor (not shown) in the web server 104, the web server 104 may perform different operations to carry out user authentication with the help of the user-specific behavioral biometrics data received from the remote browser 108. An exemplary set of such operations is illustrated in FIG. 2, which is discussed later below. More generally, the authentication module 102, upon execution, may enable the web server 104 to receive, store, and analyze the user-specific behavioral biometrics provided by the client's browser 108 through the POST request. In particular embodiments, the authentication module 102 may include an ML-based fraud detection model with multiple ML-based classifiers. The creation (or training) and deployment of an exemplary fraud detection model are discussed in more detail later with reference to FIGS. 3-8. Initially, every time the user of the client machine 106 logs-in to the website hosted by the server 104, the authentication module 102 may use the received user-specific behavioral biometric data (through the corresponding POST requests from the browser 108) to train (and re-train) various classifiers in the fraud detection model until each classifier in the ML model attains a corresponding pre-defined level of performance against a given performance metric, as discussed in more detail later below. The trained ML model may be viewed as "linking" the user of the client machine 106 to his/her behavioral biometric "signature" received upon log-in. Once the ML model is trained, the authentication module 102 may use the trained model to determine whether the received log-in content (for example, username and password) is indeed from the actual user of the client machine 106 (whose behavioral biometric "signature" has been established) or from an impersonator or another/different user of the client machine 106. Upon making the authentication decision, the security module 102 may configure the server system 104 to send an appropriate web response—classifying the login activity as genuine or fraudulent—to the client computer 106 (or other computing device from which the log-in has been attempted).

It is noted here that the client-server based arrangement 100 shown in FIG. 1 is only one example of how website logins may be secured using behavioral biometrics and machine learning. In some embodiments, the functionality of the authentication module 102 may be implemented in a non-server system as well. The non-server system may be associated with an entity or system providing the website content to a remote user. Thus, the terms like "server" or "web server" are used herein by way of an example only; they should not be construed to limit the type of the system—whether operating in a server configuration or otherwise—that can be used to offer the website security/user authentication functionality based on behavioral biometrics as per teachings of the present disclosure.

FIG. 2 is an exemplary flowchart 200 depicting various steps that may be performed by a computing system as per particular embodiments of the present disclosure to secure website logins by a user based on the user's behavioral biometrics and machine learning (ML). In one embodiment, the computing system may be the web server 104 shown in FIG. 1. More generally, the computing system 104 performing the steps shown in FIG. 2 may include in hardware and/or software the functionality of the authentication module 102 and, hence, the computing system 104 may be considered a security-enabled system capable of security website logins as per teachings of the present disclosure. In one embodiment, the program code for the authentication module 102 (and other relevant program code such as the program code for the OS 114) may be executed by a processor (not shown) in the computing system 104 and, upon execution of the program code, the computing system 104 may be operative to perform the tasks illustrated in FIG. 2.

Initially, the computing system may receive a user-specific dataset for a first user when the first user performs a log-in to a website, as noted at block 202. The first user may be the user of the client computer 106 performing a log-in to a website hosted by the computing system (for example, the web server 104), as discussed earlier with reference to FIG. 1. The user-specific dataset may be the behavioral biometric data of the first user collected by the web browser 108 and sent to the computing system via a POST request, as mentioned earlier. Additional details of this data collection are provided later with reference to discussion of FIGS. 3-5. As noted at block 203, the computing system may train a plurality of ML-based classifiers in an ML model based on the received user-specific dataset. The ML model (containing an ensemble of ML classifiers) may be created by and part of the user authentication module 102. As discussed later, in some embodiments, the ensemble of ML classifiers may include the following three classifiers: a Multilayer Perceptron (MLP) based classifier, a Support Vector Machine (SVM) based classifier, and an Adaptive Boosting (AdaBoost) based classifier. Additional details of creation and deployment of this ML model are provided later with reference to discussion of FIGS. 3-8. In certain embodiments, as noted at block 204, the computing system may use the trained ML model to reject a log-in attempt to the website by a second user with log-in credentials of the first user. The second user is different from the first user. As noted at block 206, the second user may be a human user (for example, a human hacker or impersonator) or a non-human user (such as a robot or other automated device). In this manner, a client's behavioral biometrics may be used along with machine learning to provide "intelligent" security to detect and thwart malicious website log-ins.

In particular embodiments, the user-specific dataset (mentioned at block 202) may include the following behavioral biometrics of the first user:

(1) Coordinates of a pointing device (such as a computer mouse) at each time the pointing device is moved by the first user during the log-in.

(2) Timestamps associated with pressing and release of each key on a data input device (such as a computer keyboard) by the first user during the log-in.

(3) Timestamps of all clicks of the pointing device by the first user from beginning to end of the log-in.

(4) A key-specific code of each key being pressed by the first user on the data input device during the log-in.

Additional details of extraction of user-specific features from this dataset for analysis and building of the ML model are provided later with reference to discussion of FIGS. 4-5.

Figure 3:
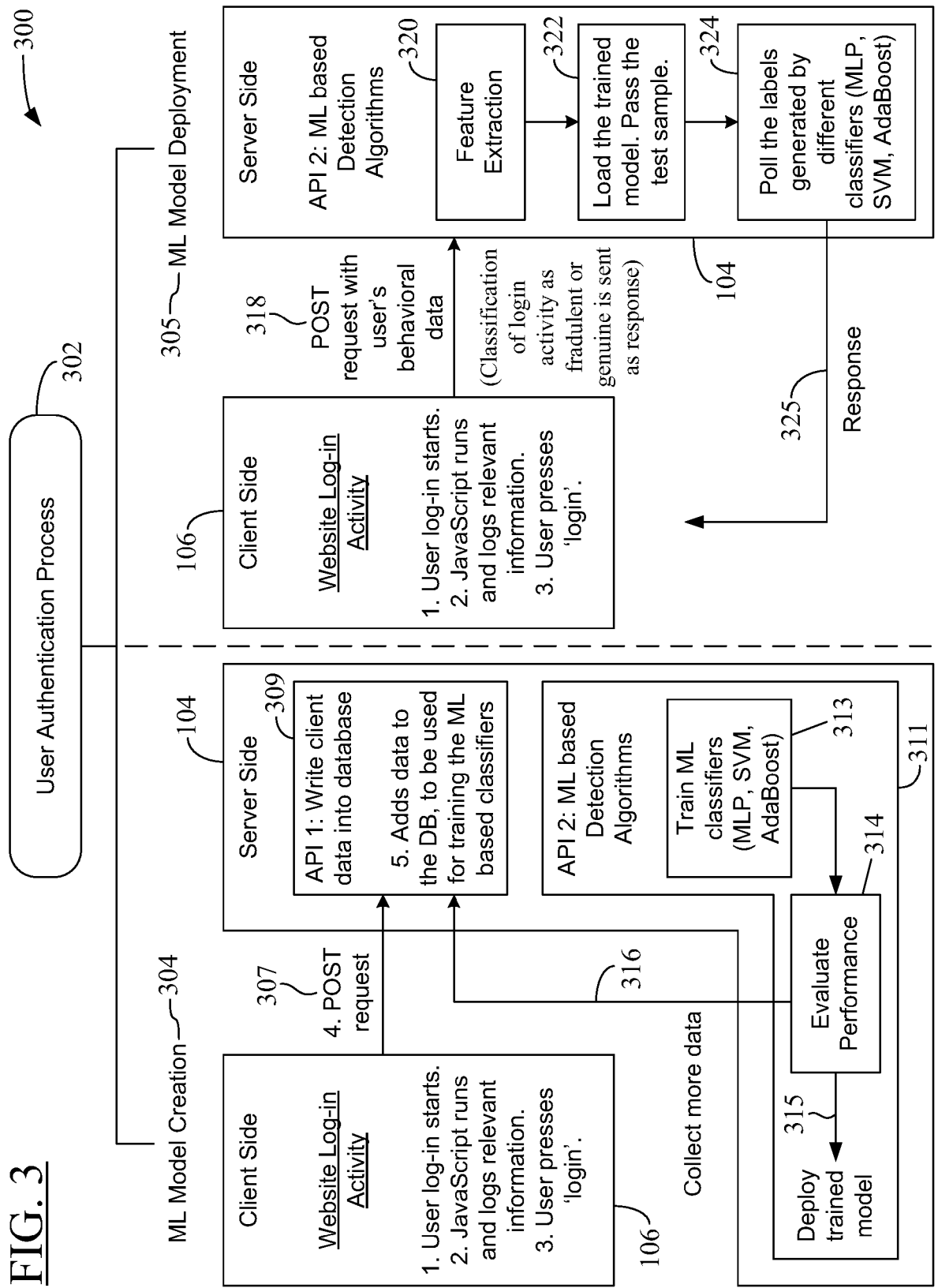
FIG. 3 depicts an exemplary flow of events for creation and deployment of an ML model for user authentication as per particular embodiments of the present disclosure.

FIG. 3 depicts an exemplary flow of events 300 for creation and deployment of an ML model for user authentication as per particular embodiments of the present disclosure. As noted before, the ML model may be a part of the program code for the authentication module 102 in FIG. 1. An exemplary user authentication process 302 shown in FIG. 3 may involve two primary aspects—ML model creation 304, and ML model deployment 305. As part of creation (which includes training) and deployment of the ML model, the authentication module 102, upon execution, may enable the web server 104 to perform various tasks illustrated in the flow of events 300 in FIG. 3. In particular embodiments, the authentication module 102 may provide two Application Programming Interfaces (APIs)—referred to as "API 1" and "API 2" in FIG. 3—to enable personnel on the server side to create and deploy the ML model. The APIs may facilitate writing and execution of programming scripts and applications that store and manipulate persistent objects, such as, for example, user datasets received from the client computer 106 or similar log-in contents received from hackers/unauthorized users. It is noted here that the APIs may not be accessible to the user of the client computer 106 and their execution may be transparent to the user. It is further noted that the two API-based implementation in FIG. 3 is for illustrative purpose only. In particular embodiments, there may be more or less APIs than those shown in FIG. 3 to implement the requisite functionalities of the security module 102.

In the ML model creation aspect 304, a user's user-specific behavioral biometric data may be repeatedly collected and an ML model may be trained (and re-trained) on the collected dataset till the ML model attains a corresponding pre-defined level of performance against a given performance metric—for example, a specified accuracy. The data collection process may depend on the client's website log-in activity. Thus, as shown in block 106 under the "ML Model Creation" portion 304 in FIG. 3, when the user starts to log-in to a website through the website-supplied log-in webpage (task "1" in FIG. 3), the earlier-mentioned browser-based JavaScript (supplied by the web browser 108 in FIG. 1) may run and start logging the relevant user-specific behavioral biometric dataset (task "2" in FIG. 3), such as the one defined at block 207 in FIG. 2. The log-in webpage may define what information needs to be collected using the JavaScript® and sent to the server computer 104. Once the user concludes entry of the relevant log-in information (for example, username and password), the user may press/select a "login" radio button (or similar data input choice) on the webpage (task "3" in FIG. 3) to transmit the user's log-in credentials from the client computer 106 to the remote web server 104. As part of this log-in process, the web browser 108 on the client side 106 may send a POST request (task "4" in FIG. 3) containing the collected behavioral biometric data of the user to the web server 104.

Upon receipt of the POST request with relevant user-specific behavioral biometric data, the API-1 in the authentication module 102 may write the client dataset into a database (such as the database 119 in FIG. 1), as noted at task "5" in block 309 in FIG. 3. This dataset may be used (by the second API, or API-2) for training the ML-based classifiers in the ML model. As noted in block 311, the API-2 may train and evaluate performance of various ML-based detection algorithms/classifiers. As noted at block 313, an ensemble (or group) of earlier-mentioned three classifiers—MLP, SVM, and AdaBoost—may be trained in particular embodiments of the present disclosure. Before training the classifiers, the API-2 may retrieve the dataset stored at block 309 and extract relevant features from the dataset to be supplied to the classifiers during training. This feature extraction aspect is discussed later with reference to FIGS. 4-5. After the initial training at block 313, the performance of each classifier may be evaluated along one or more pre-defined performance metrics (block 314). In particular embodiments, each classifier may be evaluated against a set of three performance metrics: (i) accuracy of the classifier, (ii) precision of the classifier, and (iii) recall ability of the classifier. These performance metrics are discussed in more detail later with reference to FIG. 8. When each classifier yields a pre-defined level of performance against each performance metric, the "training" phase (blocks 313-314) may conclude. The ML model (containing the trained classifiers) may be referred to as a "trained ML model" and may be deployed (during the deployment phase 305) for future classifications of genuine and fraudulent logins, as indicated at arrow 315 in FIG. 3. On the other hand, if each classifier still does not yield a pre-defined level of performance against each performance metric, the "training" phase (blocks 313-314) may continue by the authentication module 102. As part of this continued training, the authentication module 102 (through its APIs) may continue to collect more datasets (from subsequent/future logins by the user of the client machine 106 or other non-users/hackers attempting website logins based on the actual user's log-in credentials) and continue to re-train the classifiers in the ML model, as indicated by arrow 316 in FIG. 3. In particular embodiments, the length of the data collection period (at arrow 316) may be dynamically determined by monitoring the variability of the user's typing/data-entry pattern.

It is noted here that whenever the user logs-in for the first time (using a new username and password) or registers a new password, new behavioral biometric data may need to be collected for a user-specific, customized ML model to be created and trained. While the ML model is being trained, it may be preferable to avoid using the partially-trained ML model for identity verification. Rather, while additional data are being collected (at arrow 316) during this training phase, an ordinary level of account security (for the user) can be maintained with the conventional password security system, which may include, for example, requiring the user to re-enter the password, to set-up and provide answers to one or more security questions, to receive and report (to the website) a One Time Password (OTP) sent to the user's registered e-mail account or mobile phone, to respond to a CAPTCHA (Completely Automatic Public Turing test to tell Computers and Humans Apart) challenge-response test, or to participate in any other multi-factor authentication/verification.

In the ML model deployment 305, the trained ML model (at arrow 315) may operate on each received dataset (in POST requests) to classify the login activity as genuine or fraudulent. The block 106 under the "ML Model Deployment" portion 305 in FIG. 3 is the same as that under the "ML Model Creation" portion 304. Hence, for the sake of brevity, the earlier discussion of a user's website log-in activity and transmission of the POST request is not repeated here. The POST request under the portion 305 is identified using the reference numeral "318" simply to distinguish it from the POST request 307 at task "4" under the portion 304. It is understood that there is no difference in the generation and transmission of these POST requests 307, 318, both of which are "web requests" collectively identified using the reference numeral "116" in FIG. 1. In particular embodiments, a web browser (such as the browser 108 in FIG. 1) may continue to send user-specific behavioral biometric data through POST requests every time a log-in attempt is made—whether during the model creation phase 304 or during the model deployment phase 305—to the website hosted by the remote web server 104. Although the client computer 106 is shown to be sending a POST request to the server 104 in FIG. 3, it is understood that the log-in attempt may be made by an impostor (whether a human or a robot) using a different computer or by an unauthorized user operating the same client computer 106, but using the actual/authorized user's log-in credentials to log-in to the website at the server 104. For ease of illustration, all such log-in scenarios are not depicted in FIG. 3.

Upon receipt of the POST request 318 with the user's behavioral data, the API-2 in the authentication module 102 may initially extract relevant features from the received dataset (block 320) to generate a test sample. As noted before, this feature extraction aspect is discussed later with reference to FIGS. 4-5. In some embodiments, the dataset in the POST request 318 may be temporarily stored in a memory (not shown) in the server 104 before features are extracted therefrom. In any event, the duration of storage of user-specific biometric datasets is not relevant to the present discussion, and, hence, additional details thereof are not provided herein. At block 322, the API-2 may load the trained ML model and pass the test sample (generated at block 320 through feature extraction) to the model for analysis. Each classifier in the ML model may analyze the test sample and generate a label for the sample based on some measure of inherent similarity between the test sample and the training samples/datasets (received during the ML model creation 304). In particular embodiments, the label may identify the test sample as "genuine" or "fraudulent." At block 324, the API-2 may poll the labels generated by different classifiers—MLP, SVM, and AdaBoost—in the ML model to provide a response (at arrow 325) to the client computer 106 (or any other computing system through which website log-in has been attempted) whether log-in is allowed or rejected. The response at arrow 325 may be considered as one of the web responses collectively identified using the reference numeral "117" in FIG. 1. In certain embodiments, all of the classifiers must label the test sample as "genuine" for log-in to be allowed. In other embodiments, it may suffice to authorize a log-in if the average prediction probability of the three classifiers exceeds a suitable limit or if a simple majority (here, two out of the three) of classifiers label the test sample as "genuine."

Before continuing further, it is noted that the discussion of FIGS. 4-8 below is in the context of an experiment conducted to develop an ML model for securing website logins as per teachings of the present disclosure. In that regard, it is observed that FIGS. 4-5 relate to the feature extraction (or feature engineering) aspect mentioned earlier in the discussion of FIG. 3. On the other hand, the tables in FIGS. 6 and 7 relate to accuracies of various classifiers for different mini-batches of mouse activity devised to evaluate the performance of the classifiers during the experiment. Finally, FIG. 8 shows a summary of the classifiers selected for inclusion in a saved (trained) ML model during the experiment. It is further noted here that the dataset utilized in the experiment was created by mimicking login activity at a dummy login page by eight (8) different typists (or participants)—1 true user and 7 impostors, all entering the same login credentials into the created portal. It is understood that the dummy login page may be used during the experiment phase for the sake of convenience only. The dummy login page may be similar to the actual login page discussed earlier with reference to FIG. 3, except that full website functionality may not be available to users of the dummy login page. Using the dummy login page, a total of 102 login sessions were recorded out of which 65 sessions were of the true user and 37 sessions were of fraudulent login attempts.

For each log-in (on the dummy login page) by a participant in the experiment (whether the true user or an impostor), the following behavioral information was collected by the web browser on the participant's machine using the browser's in-built JS libraries:

(1) Coordinates of a pointing device (such as a computer mouse) at each time instant the pointing device is moved by the participant during the log-in. The time instant may refer to the time when any kind of mouse movement happens. However, these mouse movements exclude mouse clicks, which are separately timestamped (as discussed below). In order to eliminate the impact of different browsers used by different participants (or by clients/users in an actual implementation), features like mouse speed, which use a time difference and not a time itself, may be extracted as discussed below. Because mouse coordinate data is logged (by a browser) every time the cursor moves, the mouse coordinate data object is very large. Hence, instead of using the entire data object, different mini-batches of mouse coordinate data were used, as discussed in more detail below.

(2) Timestamps associated with pressing and release of each key on a data input device (such as a computer keyboard) by the participant during the log-in.

(3) Timestamps of all clicks of the pointing device by the participant from beginning to end of the log-in.

(4) A key-specific code of each key being pressed by the participant on the data input device during the log-in. In the experimental setup, the key-specific code was the American Standard Code for Information Interchange (ASCII) code of the letter or symbol associated with the respective key.

FIG. 4 shows an exemplary illustration of how a user's mouse movements may be categorized into various classes as per certain embodiments of the present disclosure. As shown in the circle 400 and tabulated in table 402 in FIG. 4, a participant's mouse movement (as given by the mouse coordinates) was categorized into one of 8 (eight) classes—class 1 through class 8—based on the relative direction of angular movement of the mouse. For example, if the participant's mouse coordinate data indicate that the mouse was moved in the angular range of 0 to less than 45 degrees, such angular movement may be assigned to "Class 1"; if the mouse movement is 45 degrees or more, but less than 90 degrees, it may be assigned to "Class 2"; and so on. In some embodiments, angular movement from 0 to 45 degrees may be assigned to "Class 1"; angular movement of more than 45 degrees up to (and including) 90 degrees may be assigned to "Class 2"; and so on. For ease of reference, simple angular ranges—with overlapping angle values at the class "boundaries"—are shown in the table 402. It is understood, however, that one of the above-mentioned classification approaches may be implemented to avoid assigning two different classes for angular values at the class "boundaries"—like 45 degrees, 90 degrees, 135 degrees, and so on. In case of the embodiment in FIG. 3, a similar classification may be performed—as part of the feature extraction at block 320 or as part of the training of the ML model at block 313—for the mouse movements of a user based on the mouse coordinates received in the POST request(s). A similar categorization approach also may be used for the movement of a pointing device that may not be a traditional mouse—such as, for example, a touch pad on a computer keyboard. However, for ease of discussion, only the term "mouse" is used in the description herein to cover all such variants of a pointing device associated with a computing system.

As part of the experiment, a participant's mouse activity was divided into two sets of mini-batches for each login session: one set of four (N=4) mini-batches, and the other set of five (N=5) mini-batches. Thus, two sets of feature sets were generated (as discussed in more detail below)—one with N=4 and the other with N=5—to see the tradeoff between accuracy and computational load. Although N=5 option gave more features and was computationally more expensive, it provided an overall better result in terms of performance, as discussed later with reference to comparison of FIGS. 6-7. Hence, the final ML model of FIG. 8 was based on the classifiers trained under the N=5 option.

Within each mini-batch, each mouse movement was classified into one of 8 classes mentioned before with reference to FIG. 4. After this categorization of mouse movements, the following features were extracted as an average of attributes logged across the mini-batch for each class:

(1) Average speed of the mouse in x-direction, per class.

(2) Average speed of the mouse in y-direction, per class.

(3) Average speed of the mouse, per class. This feature may be calculated from the above two features as follows: Assume that the participant's mouse moved to two points P1 and P2 having corresponding co-ordinates (x1, y1) and (x2, y2). These movement points (or mouse coordinates) also may have corresponding timestamps (or time values) t1 and t2. The speed in the x-direction is given as the ratio $(x2-x1)/(t2-t1)$, and the speed in the y-direction is given as the ratio $(y2-y1)/(t2-t1)$. Hence, the average speed of the mouse=Euclidean distance $(P1, P2)/(t2-t1)$. This feature was calculated for each set of points for the particular class. The class-specific averages mentioned in items (1) and (2) above were also calculated in a similar manner based on the average of all relevant calculations (here, speeds in the x-direction and the y-direction) for the particular class.

(4) Average distance covered by the mouse, per class.

(5) Percentage of mouse movements logged per class.

Based on the above methodology, 5 (five) features per class per mini-batch can be extracted. Because there are 8 (eight) classes of mouse movements (as shown in FIG. 4), this translates to 40 features per mini-batch. In case of N (number of mini-batches) as 4 (four), a total of 160 features were extracted from the mouse activity logs (or mouse coordinates) received from a participant's browser. Similarly, for N=5, a total of 200 features were extracted.

The click times—here, the timestamps of all clicks of the pointing device by the participant from beginning to end of the log-in—provide an approximation of how long the participant (or a user in the embodiment of FIG. 3) takes to log-in. In calculating this log-in duration, a simple assumption was made that the first click of a mouse is to enter the username field, while the last one is to submit the entered credentials. In this manner, the total log-in time was extracted as a relevant feature from the timestamped click patterns.

FIG. 5 is an exemplary table 500 depicting categories that may be assigned to a user's keystrokes on a data input device as per particular embodiments of the present disclosure. These categories may be used for a user's keystrokes in the embodiment of FIG. 3. In the case of the experiment under discussion, the categories in the table 500 relate to the keystrokes of a participant. Each keystroke results in a key-specific ASCII code of the key pressed by the participant (or user) on the associated data input device, such as a computer keyboard. A "key" may be a hardware key on a conventional computer keyboard or a software "key" on a virtual keyboard (such as a keyboard displayed on a computer touch-screen). For extracting certain features from the keystrokes, two tasks were carried out:

(1) First, the typing activity of each participant was divided based on the kind of key that was pressed: control keys, shift-altered keys, lower case keys, or other keys. Each keystroke was associated with one of the four key categories based on the kind of the key that was pressed, as illustrated in the table 500 in FIG. 5. The received key-specific ASCII codes can identify which key was pressed by the participant. All content—whether letters, symbols, or alpha-numeric entries—was broadly classified into four categories without assigning individual ASCII code. This broad categorization in FIG. 5 thus avoided logging or storing the actual password content entered by the participants (or users). Such an approach may be necessary to avoid privacy-related legal implications that may arise in practice from logging of sensitive client data.

(2) Next, the entire session-specific keystrokes of a participant were split into two sets: a first set of keystrokes for typing the username, and a second set for typing the password. For each of these two sets, the following two features were extracted:

(i) Mean flight time, per key category (in FIG. 5).
(ii) Mean dwell time, per key category (in FIG. 5).

As mentioned earlier, the "dwell time" refers to the time a key remains pressed, and the "flight time" refers to the time between a key goes "up" and the next key goes "down". The flight and dwell times may be extracted from the timestamps associated with pressing and release of each key (on a data input device) by the participant during the log-in The above-described features of mean flight time and mean dwell time resulted in 2 (two) features for each input (there are 2 inputs, namely, username and password), resulting in a total of 4 (four) features per category of keys. Because 4 (four) categories were defined in the table 500 in FIG. 5, a total of 16 such features were obtained. In addition, mean and standard deviation of dwell and flight times were also extracted for each type of input (namely, username and password), across all 4 categories. This resulted in another 8 features. Finally, the distribution of keystrokes (as a percentage) were noted across all categories, resulting in 4 (four) more features. Thus, a total of 28 features were extracted from the keystroke logs.

In case of N=4 (four mini-batches), for example, the feature vector for each session came to a length of 189 (=160 features from mouse activity+1 feature representing the total log-in time+28 features from the keystroke logs). On the other hand, for N=5 (five mini-batches), the feature vector for each session came to a length of 229 (=200 features from mouse activity+1 feature representing the total log-in time+ 28 features from the keystroke logs). In other words, the feature extraction described above resulted in 189 features for each data point for N=4, and 229 features for each data point for N=5.

An ML model containing the earlier-mentioned three classifiers—MLP, SVM, and AdaBoost—was created for training and deployment. (A similar methodology may be used for training and deployment of the ML model discussed earlier with reference to FIGS. 1-3.) The classifiers for detecting fraudulent log-ins were implemented in the Python™ programming language supported by Python Software Foundation (www.python.org), using the scikit learn (also referred to as "sklearn") library (scikit-learn.org) in Python. The sklearn library provides a range of supervised and unsupervised learning algorithms via a consistent interface in Python™. In case of the MLP based classifier, a neural network with 2 (two) hidden layers, each containing 250 neurons and a tan h (hyperbolic tangent) activation function was created. The MLP classifier was trained using the Adam optimizer, with a mini-batch size of 1 (one) sample and an initial learning rate of 0.001, which was updated adaptively. Adam is a known optimization algorithm that can to update (neural) network weights iteratively based on training data. In case of the SVM based classifier, the LIBSVM implementation using a polynomial kernel of degree 3 (three) was used. The LIBSVM is an open source, machine learning library that implements an algorithm for kernelized SVMs, supporting classification and regression. The AdaBoost based classifier was implemented by creating an ensemble of decision trees, each with a maximum depth of 200, using the AdaBoost module of the earlier-mentioned sklearn library.

In particular embodiments, the above-described ML model with simple architecture may be preferable over deep learning models to ensure that the fraud detection—which would involve polling of the above three classifiers—does not become too computationally expensive. A less complex fraud detection model may allow the website to maintain its performance—from user's perspective—without significantly slowing it down during the log-in phase.

As mentioned before, the dataset during the experiment consisted of biometrics from 102 user logins. In order to evaluate the performance of the selected ML model, some data from these login sessions was set aside for "testing" the performance of the model. Hence, the collected dataset was randomly split into Training sets (used to create the model) and Testing (used to evaluate the performance of the model) sets, and the average accuracy of the model was evaluated over 50 such splits. This was done to understand the optimal amount of data required to create an effective ML model. For example, an "80:20 Train:Test split" means that 80% of the collected dataset was used for Training, whereas 20% was used for Testing. Similarly, a "60:40 Train:Test split" means that 60% of data was used for training, whereas 40% was used for testing. Other Test:Train splits shown in the tables 600 (FIG. 6) and 700 (FIG. 7) may be similarly interpreted.

It is noted here that because the selected ML model is to be used in a security application (to secure website logins from users), it may be preferable to build and train the model with as little data as possible and then improve it with subsequent use. For example, in case of the experiment under discussion (or, more generally, in the context of the implementation in FIG. 3), assume that "S" samples are needed to create the fraud detection model. In that case, a participant's (or a user's, in the context of FIG. 3) account may have the default level of security till the "S" samples are collected. Therefore, it may be desirable to investigate the performance of the selected ML model on different Train:Test splits to find the smallest size of Train data that produces a reasonably good fraud detection model.

The results for different lengths of the feature vector are tabulated in FIGS. 6-7 by varying the mini-batch size of mouse movements (N). As mentioned earlier, in the experiment under consideration, the feature vector for each session had the length of 189 for N=4 and 229 for N=5. FIG. 6 shows an exemplary table 600 comparing accuracies of various ML classifiers for different train:test splits as per one embodiment of the present disclosure when a user's (here, a participant's) mouse activity was divided into 4 mini-batches (N=4) for each session. FIG. 7 shows another exemplary table 700 comparing accuracies of various ML classifiers for different train:test splits as per one embodiment of the present disclosure when a user's (here, a participant's) mouse activity was divided into 5 mini-batches (N=5) for each session.

From the tables 600, 700 in FIG. 6-7, respectively, it is observed that although N=5 option gave more features (with a longer feature vector) and was computationally more expensive, it provided an overall better result in terms of performance. Hence, the final ML model of FIG. 8 was based on the classifiers trained under the N=5 option. FIG. 8 is an exemplary table 800 showing performance summary of various classifiers in a saved ML model as per one embodiment of the present disclosure. The saved ML model in the table 800 may be considered as a "trained model" that can be loaded and used in a real-time fraud detection API, such as the API-2 discussed earlier with reference to FIG. 3. Each classifier in the ML model in table 800 was trained until it attained a corresponding pre-defined level of performance against three performance metrics: accuracy, precision, and recall. The table 800 in FIG. 8 summarizes the performance of the chosen classifiers against a set of performance metrics.

It is noted here that "accuracy" of a classifier may be defined as the proportion of correctly classified samples to the total samples. Because "accuracy" looks at the overall performance of a classifier, it may be desirable not to lose insight on how the ML model is performing on each class. In applications such as securing website logins, the incidence of samples across user classes may not be uniform; there may be many positive samples (true user logins) and very few negative samples (fraudulent user attempting to login). Hence, if only the accuracy of a classifier is evaluated, it may not be possible to know how well the model is identifying fraudulent logins because the performance on true logins will have a much larger contribution to the accuracy and the accuracy will be close to the performance on positive class. Hence, a classifier's "precision" and "recall" performance metrics may be considered as well. For example, in some cases, a classifier's performance may be precise, but may not be accurate. Evaluation of a classifier's performance against more performance metrics may provide a more robust ML model for fraud detection. The performance metric Precision (for user class A) may be defined as the ratio: (True logins for class A)/(Total predicted for class A). On the other hand, the performance metric Recall (for user class A) may be defined as the ratio: (True logins for class A)/(Total actual logins for class A). Both of these metrics give a much better insight into whether the model is actually correctly identifying the fraudulent logins or not.

From the tables 600, 700 in FIGS. 6-7, respectively, it is seen that the ML model (comprising the classifiers in respective tables) provided a reasonably reliable performance even on a 50:50 train:test split. This means that a reasonably-performing model may be created with around 50 samples (or user logs). Thus, a far less number of samples may be needed to create an ML model as per teachings of the present disclosure. Furthermore, when the final ML model of table 800 (FIG. 8) was loaded in an API (such as the API-2 in FIG. 3) that was created for prediction, the model performed exceedingly well without affecting the log-in performance of the website. It is seen from the table 800 that the SVM classifier in the final ML model showed the best performance on the dataset collected during the experiment. This implies that the data generated after feature extraction (or feature engineering) can easily be separated by a polynomial kernel. As a result, no matter who the user is and how fast/slow he/she types, or how much he/she traverses the mouse around the computer screen, the features to be extracted may remain the same. Thus, a similar neural network architecture may be used for creating an SVM-based detection algorithm for any user—such as, for example, the client/user discussed before with reference to FIGS. 1-3. Similarly, with reference to the MLP classifier in table 800, the results showed that the MLP's neural network with 2 hidden layers, of 250 neurons each, worked well. Across all participants, the number of features remained fixed and were independent of the length of the password. Consequently, the same neural network architecture may be used to create an equally well-performing MLP classifier for a new user—such as, for example, the client/user discussed before with reference to FIGS. 1-3. The same observations are applicable for the AdaBoost classifier in table 800 and its classification trees.

The above-described experiment and its results in FIGS. 6-8 illustrate that, in particular embodiments, the entire process of creating an ML model as per teachings of the present disclosure may be automated, by making the creation of a detection API (for example, the API-2 discussed with reference to FIG. 3) architecture-independent and purely data-dependent. Defining a certain minimum level of performance against a given performance metric (for example, a minimum required accuracy, precision, and/or recall), one can automate the deployment of the ML model into a new user's detection API by requiring data to be collected and the model to be trained (and re-trained) till the specified pre-defined level of performance against the given performance metric (accuracy, precision, and/or recall) is reached.

It is noted here that the creation and deployment of an ML model as per teachings of the present disclosure may be scaled up on live websites so long as sufficient data are collected for training the model. While the technology required to log user's behavioral biometrics may be easy to procure and implement, the sources of data may be scarce. For example, a new user on a web platform may provide the positive, user-specific samples of the dataset in his/her first few logins. However, it may be preferable to gather some negative samples as well—for example, from hackers or unauthorized users. Because there are millions of potential imposters, it may not be practical to obtain enough patterns from all kinds of imposters. Also, it is not practically feasible to publicize log-in credentials to collect potential imposter's timing vectors. Therefore, collection of negative data samples may not be possible in advance of deployment of the ML model, but may occur at run-time. For example, the model may be created and trained using a client's/user's behavioral biometrics, and then deployed to detect impostors having a different biometric "signature". While the log-in attempt of an impostor (whether human or non-human) is being rejected, the behavioral biometrics of the impostor may be collected and analyzed for further training and/or improving the ML model. In particular embodiments, a deep neural network may replace the earlier-discussed classifiers with simpler architectures to ameliorate or overcome the problem of collective negative-labeled samples.

In certain embodiments, the user-specific ML model may be trained on the positive datasets received from varied platforms and environments that a user can type from. For example, the user may do casual typing, one-handed typing, data entry from a mobile device (like a laptop or a cell phone), data entry with a touch-screen system, and so on. As a result, a more robust and effective security protocol (ML model) may be devised for web-based applications.

In particular embodiments, using the same feature engineering (also referred to as "feature extraction") approach discussed earlier, a fraud detection model may be implemented for website log-in authentications based on transactional importance. For example, for premium account holders of a website, a customized model may be created for each user/account holder. Such premium account holders may be users from large businesses or Business-to-Business (B2B) partners (or Channel Partners). The amount of activity from these accounts (and, hence, the quantity of data available for training of the detection model) may be higher as well as the importance of securing such accounts. On the other hand, for regular users—such as Business-to-Consumer (B2C) or other commercial users, free account holders, and the like, clustering these users into broad biometric classes can be done. A pre-determined number of groups (for example, 100 groups) may be created and users having similar biometric characteristics may be classified into a common group. For example, in one embodiment, users having a pre-defined threshold of commonality (for example, 60% of commonality) among their behavioral biometrics may be grouped into a single cluster or group, and cluster-specific features may be defined for such a cluster. The cluster-specific features may be generated from the biometric data collected from the users constituting the common group. The classifiers for a particular group may be trained using the cluster-specific (or group-specific) features. In the cluster-based approach, checking for the cluster into which the incoming user/client sample (comprising client-specific features) falls into and comparing it against the expected/average sample for the cluster-specific features may be sufficient protection for such regular accounts. As discussed before, client-specific features for such regular users/clients may be extracted from the received client-specific behavioral biometric dataset. The client-specific features may be analyzed using the classifiers trained on the group-specific features. Based on the analysis, the trained ML model can determine that the current client indeed belongs to the corresponding cluster/group, thereby authorizing the client to log-in to the website. When a human hacker or machine impersonator attempts to log-in, they are likely to fall into one of the groups different from the group in which the user credential was expected to belong to, thereby triggering a flag.

The behavioral biometrics based security protocol (or methodology) discussed with reference to FIGS. 1-8 makes the security of website logins customizable, where protection is available against human impostors as well as netbots and other malicious scripts. Moreover, the authentication module 102 (FIG. 1) employing this security protocol also provides the conventional protection against attacks that seek to find out log-in credentials, for example, through brute force attacks, as well as protection against impostors who already possess the user's credentials. In particular embodiments, the above-described biometrics based security protocol may replace the existing credential-based security protocols. In other embodiments, the biometrics based intelligent security arrangement discussed herein may be deployed as an accompaniment to existing security protocols based on static rules. In that case, the earlier-discussed ML model may be combined with existing security protocols to provide enhanced security for the user profile, even when a user's log-in credentials are compromised. For example, in certain embodiments, when a human or machine impersonator is suspected, the user authentication module 102 may raise an alert flag, in which case an enhanced mode of authentication may be used to ensure that the user attempting the login is indeed the correct user. This enhanced or stepped-up mode of authentication may include CAPTCHA verification, or an OTP to a device that the user has, or any other multi-factor authentication available for the user.

Furthermore, as discussed before, the ML-based fraud-detection model in the authentication module can be created with a reasonably small amount of data because of its application at the time of log-ins, which typically provide relatively small amount of data. Because the fraud detection needs to be done in real time (while the user is logging in), the ML model as per teachings of the present disclosure is not computationally expensive—that is, the evaluation of the ML model provides a consistent and effective protection against impersonators without impacting the log-in performance on the respective website. Additionally, as also mentioned before, the ML model may be easily scalable to allow for automation of the creation of the detection model for each new user/account on the respective website.

FIG. 9 illustrates an example configuration of a computer system, such as the server computer 104, that can be used to implement the user authentication module 102 described herein. The computer system (or computing device) 104 may be suitably configured to implement the functionality of the authentication module 102 according to the teachings of the present disclosure. The computer system 104 may include one or more processors 902, a memory unit 904, an interface unit 906 providing communication interfaces, one or more input devices 908, one or more output devices 910, and a peripheral storage unit 912, connected to the processor 902 as shown and configured to communicate with each other, such as via one or more system buses (not shown) or other suitable connection.

In one embodiment, the input devices 908 may provide operator inputs—such as operator inputs (for example, interactions with APIs) received during implementation stages shown in FIG. 3—to the processor 902 and the authentication module 102 for further processing. The input devices 908 may include, for example, a touchpad, a camera, a computer keyboard, a touch-screen, a joystick, a physical or virtual "clickable button," a computer mouse/pointing device, and the like. A display screen is an example of the output device 910. Other examples of an output device include a graphics/display device, a computer screen or monitor, an alarm system, or any other type of data output device. In some embodiments, the input device(s) 908 and the output device(s) 910 may be coupled to the processor 902 via an I/O or peripheral interface(s). In some embodiments, the computer system 104 may include more than one instance of the devices shown. In various embodiments, all of the components shown in FIG. 9 may be housed within a single housing. In other embodiments, the computer system 104 may not include all of the components shown in FIG. 9. Furthermore, the computing device 104 may be configured as a standalone system, as a server system, as a client system (of another server), or in any other suitable form factor.

The processor 902 is a hardware device that may include a single processing unit or a number of processing units, all of which may include single or multiple computing units or multiple cores. When the computing device 104 is a multiprocessor system, there may be more than one instance of the processor 902 or there may be multiple other processors coupled to the processor 902 via their respective interfaces (not shown). The processor 902 may include an integrated Graphics Processing Unit (GPU) or the GPU may be a separate processor device in the system 104. The processor 902 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 902 may be configured to fetch and execute computer-readable instructions stored in the memory 904, the peripheral storage 912, or other computer-readable media. In some embodiments, the processor 902 may be a System on Chip (SoC).

The memory 904 and the peripheral storage unit 912 are examples of non-transitory computer media (e.g., memory storage devices) for storing instructions that can be executed by the processor 902 to perform the various functions described herein. For example, the memory unit 904 may include both volatile memory and non-volatile memory (e.g., RAM, ROM, or the like) devices. Further, in particular embodiments, the peripheral storage unit 912 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices constituting the peripheral storage 912 may be collectively referred to as memory or computer storage media herein, and may be a media capable of storing computer-readable, processor-executable program instructions as computer program code that can be executed by the processor 902 as a particular machine configured for carrying out the operations and functions described in the implementations herein.

The computing device 104 may also include one or more communication interfaces as part of its interface unit 906 for exchanging data via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet (or, more generally, the IP network 110), and the like. Communication interfaces in the interface unit 906 can also provide communication with external storage (not shown in FIG. 9), such as in a storage array, network attached storage, storage area network, one or more databases, or the like. For example, if the database 119 in FIG. 1 is implemented as an external storage, the interface unit 906 may facilitate communication with the database 119.

The computer storage media, such as the memory 904 and the mass storage devices in the peripheral storage 912, may be used to store software and data. For example, the computer storage media may be used to store the operating system (OS) 114 for the computing device 104, various device drivers for the device 104, various inputs provided by the operator during the implementation stages in FIG. 3 or received from the client system 106 (for example, user-specific behavioral biometrics) at run-time, and the data such as audio content, video content, text data, streaming content, or any other type of content. The computer storage media also may store software applications such as a word processing application, a spreadsheet application, the authentication module 102, and the like. The program code for the software applications and the OS may be executed by the processor 902.

In one embodiment, a non-transitory, computer-readable data storage medium, such as, for example, the system memory 904 or the peripheral data storage unit 912 may store program code or software for the user authentication module 102 as per particular embodiments of the present disclosure. In the embodiment of FIG. 9, the system memory 904 is shown to include such program code. In the embodiment of FIG. 9, the authentication module 102 may operate in conjunction with the server OS 114 (FIG. 1). The processor 902 may be configured to execute the program code for the security module 102, whereby the server computer (or computing device) 104 may be operative to perform various user authentication tasks associated with the security module 102 as per the teachings of the present disclosure. In particular embodiments, such tasks may include, for example, the process steps illustrated in FIG. 2 as well as other tasks discussed with reference to FIGS. 3-8 such as, for example, creation of an ML model with multiple classifiers, reception of behavioral biometric data from users and impostors attempting to login to the website hosted by the server system 104, training of the ML model with the received datasets, deploying the trained model, polling of the ensemble of classifiers to classify the log-in activity as genuine or fraudulent, and so on. The program code or software for the security module 102 may be proprietary software or open source software which, upon execution by the processor 902, may enable the computer system 104 to perform operations to secure website logins by a remote client based on an ML-based analysis of client's behavioral biometrics as per teachings of the present disclosure.

In particular embodiments, the computing device 104 may include an on-board power supply unit 914 to provide electrical power to various system components illustrated in FIG. 9. The power supply unit 914 may receive batteries or may be connectable to an AC electrical power outlet. In one embodiment, the power supply unit 914 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions), such as the program code for the authentication module 102, that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
receiving, by a computing system, a user-specific first dataset for a first user when the first user performs a first log-in to a website, wherein the first dataset includes the following:
coordinates of a first pointing device at each time the first pointing device is moved by the first user during the first log-in,
timestamps associated with pressing and release of each key on a first data input device by the first user during the first log-in,
timestamps of all clicks of the first pointing device by the first user from beginning to end of the first log-in, and
a key-specific code of each key being pressed by the first user on the first data input device during the first log-in;
determining, by the computing system, a total log-in time for the first user based on the beginning and end of the first log-in;
training, by the computing system, a plurality of machine learning-based classifiers in a machine learning (ML) model based on the received user-specific first dataset and on the total log-in time for rejecting a log-in attempt to the website by a second user with log-in credentials of the first user by polling and aggregating each classification generated by each classifier, wherein the second user is different from the first user; and
repeating, by the computing system, said receiving and training until each classifier in the ML model attains a corresponding pre-defined level of performance against a given performance metric, wherein the performance metric is one or more of the following:
accuracy of a classifier;
precision of a classifier; and
recall of a classifier.

2. The method of claim 1, wherein the second user is one of the following:
a human user; and
a non-human user.

3. The method of claim 1, wherein the log-in credentials of the first user include:
a first user-specific user name; and
a first user-specific password.

4. The method of claim 1, further comprising:
authorizing, using the trained ML model by the computing system, the first user to log-in to the website.

5. The method of claim 1, wherein the plurality of machine learning-based classifiers includes the following:
a Multilayer Perceptron (MLP) based classifier;
a Support Vector Machine (SVM) based classifier; and
an Adaptive Boosting (AdaBoost) based classifier.

6. The method of claim 1, further comprising:
further receiving, by the computing system, a user-specific second dataset for the second user when the second user performs a second log-in to the website using the log-in credentials of the first user, wherein the second dataset includes at least one of the following:
coordinates of a second pointing device at each time the second pointing device is moved by the second user during the second log-in,
timestamps associated with each key on a second data input device being pressed and released by the second user during the second log-in,
timestamps of all clicks of the second pointing device by the second user from beginning to end of the second log-in, and
a key-specific code of each key being pressed by the second user on the second data input device during the second log-in; and
further training, by the computing system, the plurality of machine learning-based classifiers in the ML model based on the received user-specific second dataset for rejecting the second log-in by the second user using a most-recently trained version of the ML model.

7. The method of claim 6, wherein the key-specific code in the first dataset and the key-specific code in the second dataset each is a key-specific American Standard Code for Information Interchange (ASCII) code.

8. The method of claim 1, further comprising:
assigning, by the computing system, one of a plurality of pre-determined classes to each corresponding coordinate of the first pointing device associated with the movement thereof;
further assigning, by the computing system, a key-specific category corresponding to the key-specific code; and
determining, by the computing system, at least one of the following attributes of the first pointing device:
a class-specific average speed of the first pointing device in "x" direction,
a class-specific average speed of the first pointing device in "y" direction,
a class-specific average speed of the first pointing device,
a class-specific average distance covered by the first pointing device, and
a class-specific percentage of movement by the first pointing device.

9. The method of claim 1, further comprising:
creating, by the computing system, a group of users, wherein each user in the group is authorized to log-in to the website and provides behavioral biometric data having a pre-determined level of similarity with behavioral biometric data received from other users in the group;

defining, by the computing system, a group-specific set of features based on the behavioral biometric data received from the group of users;
training, by the computing system, the plurality of machine-learning based classifiers using the group-specific set of features;
extracting, by the computing system, a user-specific set of features for the first user from the received user-specific first dataset;
analyzing, by the computing system, the user-specific set of features for the first user using the plurality of classifiers trained on the group-specific set of features;
based on the analysis of the user-specific set of features, determining, by the computing system, that the first user belongs to the group of users; and
authorizing, by the computing system, the first user to log-in to the website.

10. A computing system comprising:
a memory storing program instructions; and
a processing unit coupled to the memory and operable to execute the program instructions, which, when executed by the processing unit, cause the computing system to:
receive a user-specific first dataset for a first user when the first user performs a first log-in to a website, wherein the first dataset includes the following:
coordinates of a first pointing device at each time the first pointing device is moved by the first user during the first log-in,
timestamps associated with pressing and release of each key on a first data input device by the first user during the first log-in,
timestamps of all clicks of the first pointing device by the first user from beginning to end of the first log-in, and
a key-specific code of each key being pressed by the first user on the first data input device during the first log-in;
determine, by the computing system, a total log-in time for the first user based on the beginning and end of the first log-in;
train a plurality of machine learning-based classifiers in a machine learning (ML) model based on the received user-specific first dataset and on the total log-in time for rejecting a log-in attempt to the website by a second user with log-in credentials of the first user by polling and aggregating each classification generated by each classifier, wherein the second user is different from the first user; and
repeat said receiving and training until each classifier in the ML model attains a corresponding pre-defined level of performance against one or more of the following performance metrics:
accuracy of a classifier;
precision of a classifier; and
recall of a classifier.

11. The computing system of claim 10, wherein the plurality of machine learning-based classifiers includes the following:
a Multilayer Perceptron (MLP) based classifier;
a Support Vector Machine (SVM) based classifier; and
an Adaptive Boosting (AdaBoost) based classifier.

12. The computing system of claim 10, wherein the program instructions, upon execution by the processing unit, cause the computing system to:
further receive a user-specific second dataset for the second user when the second user performs a second log-in to the website using the log-in credentials of the first user, wherein the second dataset includes at least one of the following:
coordinates of a second pointing device at each time the second pointing device is moved by the second user during the second log-in,
timestamps associated with each key on a second data input device being pressed and released by the second user during the second log-in,
timestamps of all clicks of the second pointing device by the second user from beginning to end of the second log-in, and
a key-specific code of each key being pressed by the second user on the second data input device during the second log-in; and
further train the plurality of machine learning-based classifiers in the ML model based on the received user-specific second dataset for rejecting the second log-in by the second user using a most-recently trained version of the ML model.

13. The computing system of claim 10, wherein the program instructions, upon execution by the processing unit, cause the computing system to:
assign one of a plurality of pre-determined classes to each corresponding coordinate of the first pointing device associated with the movement thereof;
further assign a key-specific category corresponding to the key-specific code; and
determine at least one of the following attributes of the first pointing device:
a class-specific average speed of the first pointing device in "x" direction,
a class-specific average speed of the first pointing device in "y" direction,
a class-specific average speed of the first pointing device,
a class-specific average distance covered by the first pointing device, and
a class-specific percentage of movement by the first pointing device.

14. The computing system of claim 10, wherein the first dataset is collected over a period of time that is determined based on monitoring a variability of a data-entry pattern associated with the first pointing device and the first data input device of the first user.

15. A computer program product comprising a non-transitory computer-usable medium having computer-readable program code embodied therein, the computer-readable program code adapted to be executed by a computing system to implement a method comprising:
receiving a user-specific dataset for a first user when the first user performs a log-in to a website, wherein the dataset includes the following:
coordinates of a pointing device at each time the pointing device is moved by the first user during the log-in,
timestamps associated with pressing and release of each key on a data input device by the first user during the log-in,
timestamps of all clicks of the pointing device by the first user from beginning to end of the log-in, and
a key-specific American Standard Code for Information Interchange (ASCII) code of each key being pressed by the first user on the data input device during the log-in;
determining, by the computing system, a total log-in time for the first user based on the beginning and end of the first log-in;

training a plurality of machine learning-based classifiers in a machine learning (ML) model based on the received user-specific dataset and on the total log-in time for rejecting a log-in attempt to the website by a second user with log-in credentials of the first user by polling and aggregating each classification generated by each classifier, wherein the second user is different from the first user; and repeating said receiving and training until each classifier in the ML model attains a corresponding pre-defined level of performance against one or more of the following performance metrics:

accuracy of a classifier;

precision of a classifier; and recall of a classifier.

16. The computer program product of claim 15, wherein the plurality of machine learning-based classifiers includes the following:

a Multilayer Perceptron (MLP) based classifier;

a Support Vector Machine (SVM) based classifier; and an Adaptive Boosting (AdaBoost) based classifier.

17. The computer program product of claim 15, wherein the method further comprises:

assigning one of a plurality of pre-determined classes to each corresponding coordinate of the pointing device associated with the movement thereof;

further assigning a key-specific category corresponding to the key-specific ASCII code; and determining at least one of the following attributes of the pointing device:

a class-specific average speed of the pointing device in "x" direction, a class-specific average speed of the pointing device in "y" direction, a class-specific average speed of the pointing device, a class-specific average distance covered by the pointing device, and a class-specific percentage of movement by the pointing device.

* * * * *